H. FOUASSE.
APPARATUS FOR RENDERING THE TRUE OR APPARENT FOCAL LENGTH OF OBJECTIVES INDEPENDENT OF CHANGES OF TEMPERATURE.
APPLICATION FILED APR. 16, 1919.

1,325,936.

Patented Dec. 23, 1919.

UNITED STATES PATENT OFFICE.

HENRI FOUASSE, OF PARIS, FRANCE, ASSIGNOR TO SOCIETE D'OPTIQUE ET DE MECANIQUE DE HAUTE PRECISION, OF PARIS, FRANCE, A JOINT-STOCK COMPANY OF FRANCE.

APPARATUS FOR RENDERING THE TRUE OR APPARENT FOCAL LENGTH OF OBJECTIVES INDEPENDENT OF CHANGES OF TEMPERATURE.

1,325,936.  Specification of Letters Patent.  Patented Dec. 23, 1919.

Application filed April 16, 1919. Serial No. 290,588.

*To all whom it may concern:*

Be it known that I, HENRI FOUASSE, citizen of the French Republic, and resident of 125 Boulevard Davout, Paris, France, have invented a new and useful Improved Apparatus for Rendering the True or Apparent Focal Length of Objectives Independent of Changes of Temperature, which invention is fully set forth in the following specification.

It is known that the focal length of an objective, and more particularly of all objectives employed in optical apparatus for measuring or other similar purposes (telemetry, stadimetry, microphotography, etc.,) should remain constant, since any appreciable variation of this length will result in putting the apparatus out of order.

This focal length—that is to say, the distance separating the nodal point of emergence of the objective from the image of an object situated at an infinite distance—varies with the temperature. As a matter of fact heat causes both the mounts and the lenses to expand, and thereby the indices of these lenses are varied. On the whole, at least in the case of ordinary glass, any rise in temperature will cause an increase of the focal length.

According to the present invention the optical elements of the objectives and their mounts are determined and established in such a manner that the effects of temperature to which the one kind of elements (the lenses) are subjected, shall be automatically compensated by the effects of temperature experienced by the other kind of elements (the mounts). By this means it is possible to provide an optical system of fixed focal length which will be independent of variations in temperature. In practice, the mount is constructed according to this invention in such a manner that its expansion due to the rise in the temperature, will cause a separation to take place between the lenses of the objective to an extent which will compensate as exactly as possible for the variation in the focal length. In other words, the nodal point of emergence which, owing to the rise in temperature, would (in a mount assumed to be unalterable) be shifted to a certain extent in one direction owing to the variation in the focal length, is shifted to an equal extent in the opposite direction by reason of the expansion of the improved mount, this expansion producing a compensating separation between the lenses.

In this example, A and B are the bi-convex and plane-convex lenses that constitute the objective and that are fixed respectively in the barrels $a$ and $b$.

According to this invention a separation between the lenses A and B can take place by the action of a rise in the temperature.

For this purpose the barrels $a$ and $b$ are each mounted at one end of two coaxial tubes A' and B' respectively, which are connected at their opposite ends and are composed of metals of suitably different coefficients of expansion. The tube A' may for instance be made of brass, and the tube B' may for instance be made of an alloy known by the name of "invar," consisting substantially of 63 per cent. of iron and 37 per cent. of nickel and of which the coefficient of expansion at the temperatures to which the apparatus are exposed, may be considered to be practically *nil*.

Figure 1:
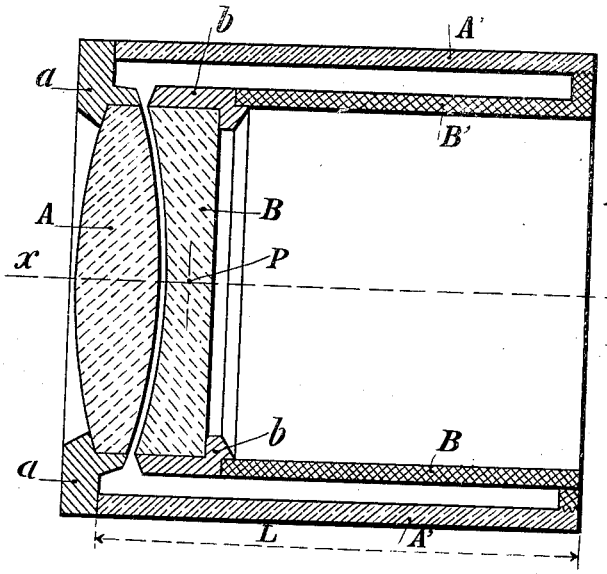
Figure 1 is a longitudinal section of a constructional form of the invention.
Figure 2:
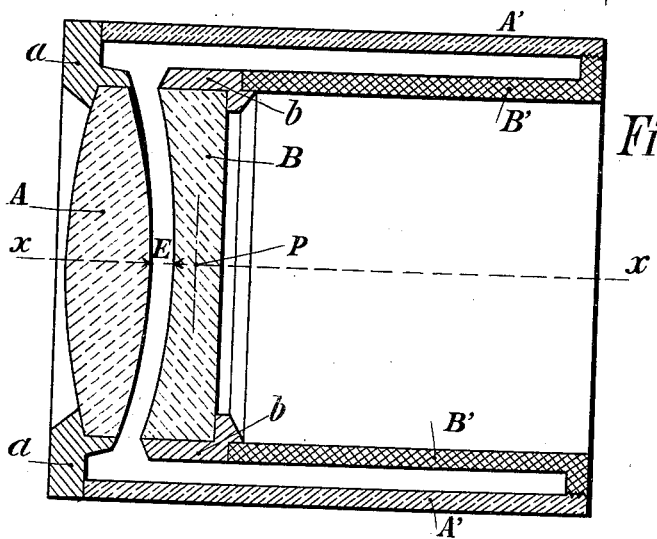
Fig. 2 is a view similar to that of Fig. 1 showing on an exaggerated scale the lenses in separated position to compensate for use of temperature.

The coefficient of expansion of brass being known, it is easy to calculate the length L which a tube of brass A' should have at a determined temperature in order that its expansion due to a rise in temperature shall produce, as illustrated on an exaggerated scale in Fig. 2, a suitable separation or interval of space E between the lenses A and B; this separation serving to compensate the effects of temperature upon the lenses A and B by returning automatically the point P into its initial position.

If F is the focal length of the optical apparatus illustrated; $f_1$ the focal length of one of the lenses; $f_2$ the focal length of the other lens; and D the distance between these two lenses at a temperature $\theta$; then if the same values be represented by the same letters with a tick mark for a temperature $\theta'$, it is known that the relations can be represented as follows:

$$F = \frac{f_1 f_2}{f_1 + f_2 - D}$$

and $$F' = \frac{f'_1 f'_2}{f'_1 + f'_2 - D'}$$

From this it follows that $F = F' =$ a constant if $$D' = f'_1 + f'_2 - \frac{f'_1 f'_2}{F}.$$

The additional amount of separation which must be produced between the lenses must be $D' - D$ when the temperature rises from $\theta$ to $\theta'$.

As an example, a long focus objective may be considered, composed of an ordinary crown glass lens and of a usual flint glass lens. The converging lens A is separated from the diverging lens B by an air space of one millimeter. Assuming the extreme temperature to be for instance 0° and 40°, the known data are as follows:

(1) At the temperature 0°:
For lens A
$R_1 = +39.000$
$R_2 = -39.156$  $e_1 = 3.000$
For lens B
$R_3 = -39.156$
$R_4 = +1127.73$  $e_2 = 2.000$ The index of refraction of the crown glass of the lens A is $n_4 = 1.51655$.
The index of refraction of the flint glass of the lens B is $n_4 = 1.62193$.
This gives $f_1 = 38.3260$
$f_2 = 60.8065$ and
$F = 99.2512$.

(2) At a temperature of 40°:
For lens A
$R'_1 = +39.0148$
$R'_2 = -39.1708$  $e'_1 = 3.0017$
For lens B
$R'_3 = -39.1663$
$R'_4 = +1128.0254$  $e'_2 = 2.0007$ The index of refraction of the crown glass of the lens A has remained unaltered, namely $n_4 = 1.51655$; the index of refraction of the flint glass of the lens B has increased and has become $n_4 = 1.62229$.

This gives:
$f'_1 = 38.3413$
$f'_2 = 60.7868$
$F' = 99.4058$.

On applying the formula $$D' = f'_1 + f'_2 - \frac{f'_1 f'_2}{F}$$

it is found that $D' = 1.0371$.

In other words, for a rise of temperature from 0° to 40°, the space separating the two lenses must increase by 0.0371 mm. The coefficient of expansion of brass being $18.10^{-6}$ and that of "invar" being assumed to be equal to zero, the result will be that the brass tube A' must have a length $$L = \frac{0.0371}{1 + 18.10^{-6} \times 40} = 20.61 \text{ mm}.$$

In the preceding description the true focal length of the system has been taken into consideration, that is to say, the absolute distance between the nodal point of emergence and the focus. But it is equally advisable to take into consideration the apparent focal length which may be defined as being the length above referred to, measured not as an absolute value, but with reference to the variations to which the mount of the instrument is subjected. Since the said mount also undergoes expansion, it may be advisable to maintain the focus at a point which, when referred to the nearest elements of the mount, apparently remains in its place. If this condition is satisfied, the setting or adjustment of the instrument is rendered independent of the temperature.

In order that this condition shall be satisfied it is sufficient to replace in the first equation above given, F by $F(1+\alpha\theta)$.

The numerical example given above shows at once that the above described process of correction will lead with a slight modification to the solution of the problem to be solved.

The expansion of the focal length in the uncorrected apparatus would be as a matter of fact equal to:

$$\frac{F' - F}{F} = \frac{0.1546}{99.2512} = \frac{1557}{1,000,000}$$

whereas the lengthening of the tube, assumed to be composed of brass, for the same difference of temperature, would only be equal to $$\frac{720}{1,000,000}.$$

The focus would remain in place relatively to the mount if the correcting power were reduced in the proportion $$\frac{720}{1557} = 0.462;$$

the brass tube would therefore have to have a length equal to $$0.462 \times 20.61 = 9.52 \text{ mm}.$$

In an optical system so constructed that the alteration in the focal length will take place in the reverse direction to that which has been assumed above, it will be sufficient to interchange the "invar" tube and the brass tube (given here by way of example) in order to obtain a decrease in the distance D as the temperature rises.

Figure 3:
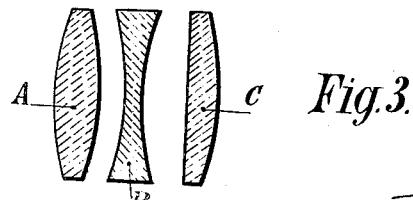
Fig. 3 is a schematic view of an objective comprising three lenses.

When the objective comprises three lenses A, B, C not in contact with one another, as illustrated diagrammatically in Fig. 3, then in order to effect compensation, either the separating space between A and B or the separating space between B and C may be controlled.

The metals of different coefficients of expansion may of course be chosen as desired because the suitable separating distance which it is desired to produce between the optical elements of the objective within selected limits of temperature, will always allow of determining the respective length to be given to the tubes carrying the barrels in which said elements are mounted.

What I claim is:—

1. A lens mount for rendering the focal distance of the objective independent of changes of temperature, comprising concentric lens supporting tubes having the ends opposite the lenses secured together, said tubes being of metals having different coefficients of expansion and adapted in expanding to automatically compensate for the changes in focal length of the optical elements due to changes in temperature.

2. A lens mount for rendering the focal distance of the objective independent of changes of temperature, comprising concentric lens supporting tubes having the ends opposite the lenses secured together, one of said tubes being of brass and the other of invar and adapted in expanding to automatically compensate for the changes in focal length of the optical elements due to changes of temperature.

In testimony whereof I have signed this specification.

HENRI FOUASSE.